United States Patent [19]
Goodall et al.

[11] Patent Number: 4,923,936
[45] Date of Patent: May 8, 1990

[54] HETEROPOLYMETALLATE METATHESIS CATALYSTS FOR CYCLOOLEFIN POLYMERIZATION

[75] Inventors: Brian L. Goodall, Akron; Larry F. Rhodes, Cuyahoga Falls, both of Ohio

[73] Assignee: The BFGoodrich Company, Akron, Ohio

[21] Appl. No.: 312,150

[22] Filed: Feb. 21, 1989

[51] Int. Cl.$^5$ .................. C08F 4/78; C08F 32/04
[52] U.S. Cl. .................. 526/115; 526/114; 526/129; 526/132; 526/137; 526/144; 526/161; 526/166; 526/281; 526/282; 526/283; 264/328.6
[58] Field of Search .............. 526/114, 161, 169, 283, 526/282, 115, 129, 132, 137, 144, 166, 281

[56] References Cited
U.S. PATENT DOCUMENTS 3,098,862  7/1963  Kobetz ..................... 526/161 X
4,380,617  4/1983  Minchak et al. ............. 526/161

Primary Examiner—Joseph L. Schofer
Assistant Examiner—F. M. Teskin
Attorney, Agent, or Firm—George A. Kap; Nestor W. Shust

[57] ABSTRACT

This invention pertains to the use of organoammonium, organophosphonium, organoarsonium heteropolymolybdates and heteropolytungstates, and mixtures thereof, as catalysts in a metathesis catalyst system in polymerization of cycloolefin monomers by ring opening polymerization. Polymerization can be by reaction injection molding in absence of a solvent whereby a thermoset polymer is produced or by solution polymerization in presence of a suitable solvent whereby a thermosetting or a thermoplastic polymer is produced. The cycloolefin monomers are selected from monocycloolefins except cyclohexane, polycycloolefins containing at least one norbornene group, and mixtures thereof.

17 Claims, No Drawings

HETEROPOLYMETALLATE METATHESIS CATALYSTS FOR CYCLOOLEFIN POLYMERIZATION

BACKGROUND OF THE INVENTION

Ring opening polymerization with a metathesis catalyst system of cycloolefins is well known. The cycloolefins for purposes herein are selected from monocycloolefins which contain 3 to 9 carbon atoms and which contain 1 to 4 double bonds, and polycycloolefins which contain a norbornene group. The metathesis catalyst system includes a catalyst and a cocatalyst. The catalyst is generally selected from molybdenum and tungsten compounds whereas the cocatalyst is selected from organometallics such as alkylaluminums and alkylaluminum halides.

U.S. Pat. No. 4,400,340 to Klosiewicz describes a tungsten-containing catalyst such as tungsten halide or tungsten oxyhalide. The catalyst is suspended in a solvent to prevent it from prepolymerizing a monomer to which is added an alcoholic or a phenolic compound to facilitate solubilization of the tungsten catalyst in the monomer and a Lewis base or a chelant to prevent premature polymerization of the solution of the tungsten compound and the monomer. Amount of the tungsten compound is 0.1 to 0.7 mole per liter of solvent. Weight ratio of the tungsten compound to the alcoholic or phenolic compound is 1:1 to 1:3, and amount of the Lewis base or chelant is 1 to 5 moles thereof per mole of the tungsten compound. Treatment of the tungsten compound should be carried out in the absence of moisture and air to prevent deactivation of the tungsten compound catalyst. The catalyst must be treated in the manner outlined above in order to render it soluble in the cycloolefin monomer. The cocatalyst in this patent is disclosed as being selected from tetrabutyltin and alkylaluminum compounds such as alkylaluminum dihalide or dialkylaluminum halide where the alkyl group contains 1 to 10 carbon atoms. The preferred alkyl group is ethyl with diethylaluminum chloride being the most preferred cocatalyst. These cocatalysts are sensitive to air and moisture but are readily soluble in the cycloolefin monomers.

U.S. Pat. No. 4,380,617 to Minchak et al., discloses metathesis catalyst systems for polymerizing cycloolefins. The catalysts are defined as organoammonium isopolymolybdates and organoammonium isopolytungstates and these catalysts are soluble in cycloolefins and are insensitive to air and moisture. The cocatalysts in this patent are similar to the cocatalysts disclosed in U.S. Pat. No. 4,400,340 and are generally selected from organometallics, particularly alkylaluminum halides although in a less preferred embodiment, other metals can be used in place of aluminum such as lithium, magnesium, boron, lead, zinc, tin, silicon, and germanium. Also, metallic hydrides can be used in whole or in part for the organometallic cocatalysts. Alkylaluminum and the corresponding organometallic compounds can also be used as cocatalysts herein.

U.S. Pat. No. 4,426,502 discloses the use of alkoxyalkylaluminum halides or aryloxyalkylaluminum halides as cocatalysts in metathesis catalyst systems to polymerize cycloolefin monomers. These cocatalysts are disclosed as especially useful in conjunction with organoammonium isopolytungstate and isopolymolybdate catalysts in polymerization of cycloolefins or norbornene-type monomers. By modifying the alkylaluminum halide cocatalysts to alkoxy or aryloxy alkylaluminum halides, the reducing power of the cocatalysts is thus lowered to provide adequate pot life for mixing various ingredients at room temperature, and for work interruptions, before initiation of polymerization and subsequent rapid polymerization.

Organoammonium isopolymolybdate and isopolytungstate catalysts contain molybdenum oxide or tungsten oxide anions, respectively, whereas organoammonium heteropolymolybdates or heteropolytungstate catalysts contain at least one other hetero atom in addition to molybdenum or tungsten.

SUMMARY

Polymerization of cycloolefins by ring opening is accomplished in the presence of a metathesis catalyst system composed of organoammonium, organophosphonium, or organoarsonium, heteropolymolybdate or heteropolytungstate catalyst and a metathesis cocatalyst. Suitable cycloolefins herein are monocycloolefins containing 3 to 9 carbon atoms in the cyclic structure and 1 to 4 double bonds therein, except cyclohexene, polycycloolefins which contain at least one norbornene group, and mixtures thereof. Polymerization proceeds by ring opening and results in a polymer which has unsaturation in the backbone. The catalysts are soluble in the monomer and are insensitive to air and moisture.

DETAILED DESCRIPTION OF THE INVENTION

This invention resides in the use of an organophosphonium, and organoarsonium-organoammonium heteropolytungstate or organoammonium heteropolymolybdate catalyst in the ring opening polymerization of cycloolefin monomers. These catalysts are soluble in hydrocarbon solvents and in the cycloolefin monomers. Cocatalysts selected from organometallic compounds and other ingredients are used in conjunction with the novel catalysts disclosed herein to polymerize the cycloolefins by solution or bulk polymerization.

Suitable heteropolymolybdate and/or tungstate catalysts are defined by the following formulas I, II, and III:

$$A_{(8-n)} [X M_{12}O_{40}] \quad (I)$$

$$A_a[Y_2M_{18-x}M'_xO_{62}] \quad (II)$$

$$A_b[Z M_{12-y}M''_yO_{40}] \quad (III)$$

where:
A = NR$_3$H, PR$_3$H, AsR$_3$H, NR'$_4$, PR'$_4$, and AsR'$_4$;
N = nitrogen
P = phosphorus
As = arsenic;
R and R' = alkyl and alkylene groups of 1–20 carbons, cycloaliphatic groups of 5–16 carbons wherein the sum of the carbons in all R and R' is large enough so that the molecule is soluble in the cycloolefin monomer(s), preferably alkyl groups of 1–18 carbons. All of the R and R' radicals cannot be small in the number of carbon atoms since such a condition will render the molecule essentially insoluble in hydrocarbons and most organic solvents. In a preferred embodiment, the R radicals are selected from alkyl groups each containing 1 to 18 carbon atoms wherein the sum of carbon atoms on all the R radicals is from 15 to 54, more preferably from 21 to 42. In a preferred embodiment, the R' radicals are selected from alkyl groups each containing from 1 to 18 carbon atoms wherein the sum of carbon atoms on all of the R' radicals is from 20 to 72, more preferably from 25 to 48.

X = elements and mixtures of such elements of Groups IB, IIB, IIIA, IVA, IVB, VA, and VIII but preferably phosphorus, silicon, boron, germanium, arsenic, titanium, and zirconium in their highest oxidation states;

M = molybdenum, tungsten, and mixtures thereof;

M' = vanadium, niobium, but preferably vanadium;

M" = vanadium, niobium, and rhenium;

m' = highest oxidation state of M' (5 for vanadium, and 5 for niobium);

m" = highest oxidation state of M" (5 for vanadium, 5 for niobium, and 7 for rhenium);

Y = $P^{+5}$, $As^{+5}$, and mixtures thereof n = highest oxidation state for the hetero atom, wherein n for the preferred hetero atoms is a positive number given below:
phosphorus = 5
silicon = 4
boron = 3
germanium = 4
arsenic = 5
titanium = 4
zirconium = 4

Z = phosphorus, silicon, and mixtures thereof
a = 16 + 6x − m'x − 2n
b = 8 + 6y − ym" − n
y = number of M" metal ions
x = number of M' metal ions The hetero atoms include only elements in Groups IB, IIB, IIIA, IVA, IVB, VA, and VIII of the periodic Table but preferably phosphorus (P), silicon (Si), boron (B), germanium (Ge), arsenic (As), titanium (Ti), and zirconium (Zr). Group IB elements include copper, silver, and gold; Group IIB elements include zinc, cadmium, and mercury; Group IIIA elements include boron, aluminum, gallium, indium, and thallium; Group IVB elements include carbon, silicon, germanium, tin, and lead; Group IVB elements include titanium, zirconium, and hafnium; Group VA elements include nitrogen, phosphorus, arsenic, antimony, and bismuth; and Group VIII elements include iron, ruthenium, osmium, cobalt, rhodium and iridium.

The heteropoly ammonium molybdates and tungstates described herein exclude the organoammonium isopolymolybdates and organoammonium isopolytungstates disclosed in U.S. Pat. No. 4,380,617.

In a preferred embodiment, formula I catalysts include tris(tridecyl)ammonium-12-molybdo-1-phosphate or tris(tridecyl)ammonium-1-phospho-12-molybdate which has the following formula corresponding to formula I, above:

$[HN(C_{13}H_{27})_3]_3 [PMo_{12}O_{40}]$;

an organoammonium-12-tungsto-1-phosphate which has the following formula also corresponding to formula I, above:

$[HNRR'R'']_3 [PW_{12}O_{40}]$ where NRR'R" group is tri-hydrogenated tallow amine sold under the trade name Adogen ®340 by Sherex Chemical Company;

tris(tridecyl)ammonium-12-molybdo-1-silicate which has the following formula corresponding to formula I, above:

$[HN(C_{13}H_{27})_3]_4 [SiMo_{12}O_{40}]$;

tris(tridecyl)ammonium-12-tungsto-1-borate which has the following formula corresponding to formula I, above:

$[HN(C_{13}H_{27})_3]_5 [BW_{12}O_{40}]$;

tris(dodecyl)ammonium-12-tungsto-1-silicate which has the following formula corresponding to formula I, above:

$[HN(C_{12}H_{25})_3]_4 [SiW_{12}O_{40}]$;

tris(tridecyl)ammonium-12-molybdo-1-titanate which has the following formula corresponding to formula I, above:

$[HN(C_{13}H_{27})_3]_4 [TiMo_{12}O_{40}]$;

and tris(tridecyl)ammonium-12-molybdo-1-zirconate which has the following formula corresponding to formula I, above:

$[HN(C_{13}H_{27})_3]_4 [ZrMo_{12}O_{40}]$.

In a preferred embodiment, formula II catalysts include tris(tridecyl)ammonium-18-molybdo-2-phosphate which has the following formula corresponding to formula II, above:

$[HN(C_{13}H_{27})_3]_6 [P_2Mo_{18}O_{62}]$;

and tris(tridecyl)ammonium-18-molybdo-2-arsenate which has the following formula corresponding to formula II, above:

$[HN(C_{13}H_{27})_3]_6 [As_2Mo_{18}O_{62}]$.

In a preferred embodiment, formula III catalysts include tris(tridecyl)ammonium-10-molybdo-2-vanado-1 phosphate which has the following formula corresponding to formula III, above:

$[HN(C_{13}H_{27})_3]_5 [PMo_{10}V_2O_{40}]$.

The molybdenum or tungsten metals of the heteropoly catalysts disclosed herein can be optionally substituted with metals of Group VB and VIIB selected from vanadium, niobium, and rhenium, but preferably vanadium. These complexes can be synthesized according to F. Ortega et al., *Inorg. Chem.* 1984, 23, 3292–3297 and G. A. Tsigdinos et al., *Inorg. Chem.* 1968, 7, 437–441. All of these complexes in the form of organoammonium, organophosphonium and organoarsonium salts, are soluble in cycloolefins containing a norbornene group.

In a metathesis catalyst system, a catalyst component is used in conjunction with a cocatalyst component to initiate a ring opening polymerization of cycloolefins containing a norbornene group or norbornene-type monomer(s). The cocatalyst component is selected from organometallics and organometallic halides, preferably alkylaluminums and alkylaluminum halides.

The alkylaluminum halides suitable herein as cocatalysts are selected from monoalkylaluminum dihalides RAlX$_2$, dialkylaluminum monohalides R$_2$AlX, aluminum sesquihalides R$_3$Al$_2$X$_3$, trialkylaluminum R$_3$Al, aluminum trihalide AlX$_3$, and mixtures thereof. In the formulas for the alkylaluminum halide catalysts, R is an alkyl radical containing 1 to 12 carbon atoms, preferably about 2 to 4 carbon atoms, and X is a halogen selected from chlorine, iodine, bromine and fluorine. Specific examples of such alkylaluminum halides include ethylaluminum dichloride, diethylaluminum monochloride, ethylaluminum sesquichloride, diethylaluminum iodide, ethylaluminum diiodide, trialkylaluminum compound with elemental iodine, propylaluminum dichloride, propylaluminum diiodide, isobutylaluminum dichloride, ethylaluminum dibromide, methylaluminum sesquichloride, and methylaluminum sesquibromide.

Also suitable herein are alkoxyalkylaluminum halides and aryloxyalkylaluminum halides defined by the following formula:

$$(RO)_a R'_b AlX_c$$

where R is an alkyl or a phenyl radical containing about 1 to 18 carbon atoms; R' is an alkyl radical containing 1 to 18 carbon atoms; X is a halogen selected from chlorine, iodine, bromine and fluorine; "a" is the number of equivalents of the alkoxy or aryloxy moiety (RO-) and can vary from a minimum of about ½ to a maximum of about 2½, preferably from about 1 to about 1¾; "b" is the number of equivalents of the alkyl group (R$^1$) and can vary from a minimum of about ¼ to a maximum of about 2, preferably from about ½ to about 1; and "c" is the number of equivalents of halogen X and can vary from a minimum of 0 to a maximum of about 2, preferably from about ¾ to about 1 ¼. The sum of a, b, and c must equal 3.0.

The heteropolymolybdate or heteropolytungstate catalyst components of this invention, or mixtures thereof, are employed at a level of 0.01 to 50 millimoles of molybdenum or tungsten and the heteropoly atoms(s) per mole of total monomer, preferably 0.1 to 10 millimoles. The molar ratio of the cocatalyst to the catalyst is not critical and can range from about 200:1 or more to 1:10, preferably 50:1 to 2:1 of aluminum or the corresponding metal to the combined amount of molybdenum or tungsten and the heteropoly atom(s).

Suitable cycloolefins herein include monocycloolefins and polycycloolefins which contain at least one norbornene group. The monocycloolefins contain 3 to 9 ring carbon atoms, preferably 5 to 8, and 1 to 4 double bonds. Examples of monocycloolefins suitable herein include cyclopentene, cycloheptene, cyclooctatriene and the like. Suitable monocycloolefins, however, exclude cyclohexenes such as cyclohexene, methylcyclohexene and other substituted cyclohexenes.

The norbornene-type monomers or the polycycloolefins that can be polymerized in accordance with the process described herein are characterized by the presence of the norbornene group, defined structurally by the following formula I:

(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Contemplated herein are also lower alkyl norbornenes and lower alkyl tetracyclododecenes wherein the lower alkyl group contains 1 to about 6 carbon atoms. Preferred monomers of the norbornene-type are those defined by the following formulas II and III:

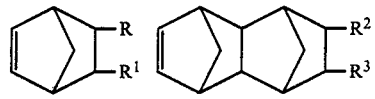

(II)            (III)

where R and R$^1$ are independently selected from hydrogen, alkyl groups of 1 to 20 carbon atoms, and saturated and unsaturated hydrocarbon cyclic groups formed by R and R$^1$ together with the two ring carbon atoms connected thereto containing 4 to 7 carbon atoms. In a preferred embodiment, R and R$^1$ are independently selected from hydrogen, alkyl groups of 1 to 3 carbon atoms, and monounsaturated hydrocarbon cyclic groups containing 5 carbon atoms, the cyclic group being formed by R and R$^1$ as well as by the two carbon atoms connected to R and R$^1$. In reference to formula III, R$^2$ and R$^3$ are independently selected from hydrogen and alkyl groups containing 1 to 20 carbon atoms, preferably 1 to 3 carbon atoms.

Examples of preferred polycycloolefin monomers referred to herein include dicyclopentadiene, oligomers of dicyclopentadiene, particularly trimers and tetramers of cyclopentadiene; methyltetracyclododecene; 2-norbornene and other norbornene monomers such as 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecyl-2-norbornene; vinyl norbornene; and ethylidene norbornene.

In solution polymerization, a hydrocarbon reaction solvent is mixed with a cycloolefin monomer or a mixture thereof, with or without other polymerizable monomers and the mixture of the monomer and solvent is charged into a reactor. A molecular weight modifier selected from nonconjugated acyclic olefins is then charged into a reactor followed by at least one organometallic or alkylaluminum halide cocatalyst and at least one heteropolymolybdate or heteropolytungstate that is soluble in the monomer. The reaction can be conducted at 0° to 100° C., preferably 20° to 80° C., or at ambient temperature and carried out to completion in less than two hours. The reaction can be shortstopped by addition of an alcohol. The resulting product is a smooth, viscous polymer cement. Upon removal of the solvent, the polymer is a thermoplastic, solid material.

Solution polymerization requires presence of a solvent. Suitable solvents for solution polymerization include aliphatic and cycloaliphatic hydrocarbon solvents containing 4 to 10 carbon atoms such as pentane, hexane, heptane, octane, cyclohexane, cyclohexene, cyclooctane and the like; aromatic hydrocarbon solvents containing 6 to 14 carbon atoms which are liquid or easily liquified such as benzene, toluene, naphthalene and the like; and substituted hydrocarbons wherein the substituents are inert, such as dichloromethane, chloroform, chlorobenzene, dichlorobenzene, and the like. Cyclohexane was found to be an excellent solvent. The polymer need not be soluble in the solvent. The solvent may be added at any point in the charging procedure, but a portion, preferably 0.1 to 10% of the total solvent, is used to dissolve the catalyst and the remainder added before the catalyst solution. Generally, ½ to 2 liters of solvent is used per 100 grams of monomer.

A solution polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide. The activator may be employed in a range from about 0 moles to about 3 moles per mole of the cocatalyst, more preferably from about 0 to about 1 mole per mole. The activator may be added at any point in the charge procedure but it is more preferably added last, or with the catalyst.

At least one nonconjugated acyclic olefin can be used as a molecular weight modifier having at least one hydrogen on each double-bonded carbon atom and containing 2 to 12 carbon atoms, more preferably 3 to 8 carbon atoms. Inert substituents on the remaining carbon atoms are selected from the group consisting of hydrogens and alkyl groups containing 1 to 8 carbon atoms. Examples of suitable acyclic olefins include 1-olefins such as 1-butene, 3-methyl-1-butene, and the like; 2-olefins; 3-olefins; and nonconjugated triolefins. More preferably, the nonconjugated acyclic olefin is selected from the group consisting of 1-olefins and 2-olefins containing 3 to 8 carbon atoms such as 1-butene, 3-methyl-1-butene, 2-pentene, 4-methyl-2-pentene, and the like. Compounds not having hydrogen atoms substituted on double-bonded carbons are unreactive in this invention. Even conjugated olefins such as butadiene, isoprene and the like are active modifiers.

The nonconjugated acyclic olefin can be used in a molar ratio to total monomer charge of from about 0.0001 to about 1 mole per mole of the monomer charge. The nonconjugated acyclic olefin can be charged directly or in solution at any point in the charge procedure, but it is more preferably charged along with the monomers. When charged last, the nonconjugated acyclic olefin is preferably charged before reaction begins.

The monomers can be added at any point in the charging procedure. Normally, however, the monomers, solvent and nonconjugated acyclic olefin are added first to the reactor vessel. These ingredients can be added separately or as a mixture of ingredients. Next, the cocatalyst and the catalyst are added separately, usually in the hydrocarbon solvent described above. The heteropoly metallate catalyst component is added following addition of the cocatalyst component although the order can be reversed. Completion of the polymerization reaction is indicated by the disappearance of the monomer in the charge, as monitored by gas chromatography.

Bulk polymerization is carried out in absence of a solvent by polymerizing cycloolefin monomer or a mixture thereof by means of a metathesis catalyst system wherein the catalyst component is a heteropolymolybdate or heteropolytungstate of this invention. The monomer can be formed into a hard object in a single step by means of reaction injection molding (RIM) process wherein polymerization takes place in a mold. Examples of such objects include business machine housings, furniture, window frames, automobile and recreation vehicle parts, and the like.

Since the heteropoly metallate catalysts described herein are soluble in a norbornene-type monomer or a mixture thereof, the polymerization can be carried out in absence of a solvent and other additives used in solution polymerization. The cocatalysts are also soluble in such monomers. This, of course, facilitates polymerization in bulk and makes it possible to polymerize the norbornene-type monomer(s) by reaction injection molding process.

If the cocatalyst does not contain any halide or if more halogen is desired, then a halogen source is used. Halogen source such as halosilanes are used in amount of 0.05 to 10 millimoles per mole of the cycloolefin monomer, preferably 0.1 to 2 millimoles per mole of the monomer. Specific examples of preferred halogen source are chlorosilanes such as dimethylmonochlorosilane, dimethyldichlorosilane, diphenyldichlorosilane, tetrachlorosilane, and the like. In bulk polymerization such as reaction injection molding process, conversion of in excess of 95%, preferably in excess of 98% can be attained, measured by the thermal gravimetric procedure.

In order to further illustrate the invention described herein, the following examples are presented that demonstrate certain aspects of the invention herein in greater detail. It is to be understood, however, that the examples are presented for illustrative purposes and not in any sense are to limit the scope of the invention herein, the scope of which is defined by the appended claims.

EXAMPLE 1

This example demonstrates preparation of tris(tridecyl)ammonium-12-molybdo-1-phosphate catalyst component which corresponds to formula I, above.

Pursuant to this preparation, 0.93 gram of tris(tridecyl)amine was dissolved in 50 mls of methylene chloride to produce a clear solution. Tris(tridecyl)amine or $N(C_{13}H_{27})_3$ was purchased as Adogen ®383. One gram of phosphomolybdic acid ($H_3PMo_{12}O_{40}$) was weighed into a reaction flask and dissolved with 75 mls of distilled water with stirring and heating for about 5 minutes. The phosphomolybdic acid solution was yellow in color. The tris(tridecyl)amine was then added to the phosphomolybdic acid in the flask and the contents of the flask were refluxed for about one hour. On mixing the two solutions, the resulting solution turned green and reaction occurred within about 5 minutes.

The contents of the flask were then cooled to room temperature and the green methylene chloride on the bottom of the flask was separated from the top clear water layer in a separatory funnel.

The methylene chloride layer was washed with distilled water several times and then stored in a hood overnight, with nitrogen gas bubbling therethrough. Most of methylene chloride evaporated overnight leaving a residue. The residue was then placed in a 45° C. vacuum oven for 2 hours and then in a 50° C. non-vacuum oven for 1 hour. The catalyst component was then stoppered and cooled to room temperature. The catalyst component was in the form of a waxy green solid. This procedure was also carried out by addition of 0.16 gram of 37% hydrochloric acid when phosphomolybdic acid was dissolved in the water. The synthesis reaction is believed to be as follows:

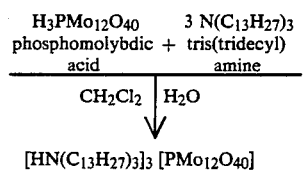

EXAMPLE 2

This example demonstrates ring-opening polymerization of 92.5 weight parts dicyclopentadiene (DCPD) and 7.5 weight parts ethylidene norbornene (ENB) with a heteropolymolybdate catalyst of Example 1.

In this polymerization, 0.1 gram of the ammonium-phosphomolybdate catalyst component of Example 1 was used with 43.7 grams of the monomers, 2.0 mls of a 0.5M solution of diethylaluminum chloride (DEAC) cocatalyst in DCPD, and 2.0 mls of a 0.25M silicon tetrachloride solution in DCPD (halogen source).

The catalyst component was added to the bottle first, followed by the monomers. The bottle was shaken vigorously until the catalyst dissolved in the monomers, producing a green colored solution. This was followed by addition to the bottle of the cocatalyst solution and mixing with the bottle contents. The result was a brown solution with a higher viscosity Brown polymer was obtained at 90° C.

EXAMPLE 3

This example demonstrates polymerization of 92.7 weight parts DCPD and 7.2 weight parts (ENB) with Adogen ®340 ammonium phosphotungstate catalyst of formula I. Adogen ®340 is reported by the supplier to typical a tertiary amine $NR_3$, where R is a linear hydrocarbyl group with approximate chain length composition as follows:

$C_{14}H_{29} = 5\%$.
$C_{16}H_{33} = 30\%$
$C_{18}H_{37} = 65\%$

The catalyst component was prepared pursuant to the following formula which corresponds to formula I, above:

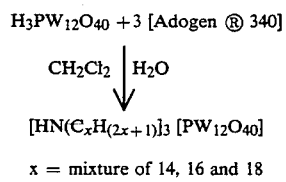

x = mixture of 14, 16 and 18

Polymerization was carried out using 0.1 gram of the Adogen 340 ammonium phosphotungstate catalyst, 43.7 grams of a monomer mixture of 92.7 weight parts DCPD and 7.5 weight parts ENB, 0.25M silicon tetrachloride solution in DCPD (halogen source), and 0.5M solution of diethylaluminum chloride cocatalyst in DCPD. As in Example 2, the catalyst component was added to a bottle followed by the norbornene-type monomers. The catalyst was solubilized in the monomers with vigorous shaking. Then, the halogen source solution and the cocatalyst solution were added with agitation, producing a blue color. The bottle was placed in a 60° C. oven and thickening occurred on top in about 30 minutes, followed by thickening throughout and resulting in a blue polymer.

EXAMPLE 4

This example illustrates ring-opening polymerization using a catalyst of formula I, in which the heteroatom is boron. The catalyst was synthesized in a manner analogous to that found in Example 1 and in accordance with the following equation:

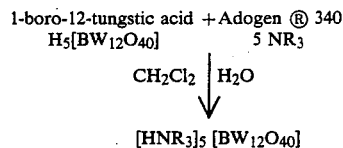

For polymerization, the following components were added to a bottle in the following order:

| Order of Addition | Material | Quantity |
| --- | --- | --- |
| 1 | $[HNR_3]_5 [BW_{12}O_{40}]$ catalyst | 0.1 g |
| 2 | 92.5% DCPD/7.5% ENB | 44.0 g |
| 3 | 0.25 M $SiCl_4$ in DCPD | 2.0 ml |
| 4 | 0.5 M DEAC in DCPD | 2.0 ml |

This recipe gave a brown solid polymeric material after 30 minutes at 121° C.

EXAMPLE 5

This example illustrates ring-opening polymerization using a catalyst of formulation I, in which the heteroatom is silicon. The catalyst was synthesized in a manner analogous to that found in Example 1 and in accordance with the following equation:

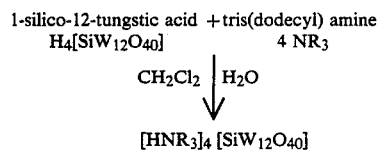

For polymerization, the following components were added to a bottle in the following order:

| Order of Addition | Material | Quantity |
| --- | --- | --- |
| 1 | $[HNR_3]_4 [SiW_{12}O_{40}]$ catalyst | 0.1 g |
| 2 | 92.5% DCPD/7.5% ENB | 44.0 g |
| 3 | 0.25 M $SiCl_4$ in DCPD | 2.0 ml |
| 4 | 0.5 M DEAC in DCPD | 2.0 ml |

This recipe gave a dark blue solution which was subsequently heated to 121° C. A dark polymeric material formed after 15 minutes.

EXAMPLE 6

This example demonstrates operability of a formula II catalyst, ammonium-18-molybdo-2-phosphate, which was prepared as described by H. Wu in the *J. Biol. Chem.*, 1920, 43, 189–220.

Pursuant to the above procedure, 50 grams of sodium molybdate hydrate was dissolved in about 450 ml of deionized water, 15 ml of 80% phosphoric acid, and 80 ml of concentrated hydrochloric acid. After addition of the hydrochloric acid, the clear solution became bright yellow which, in about 40 minutes, became yellow-orange. Refluxing was started and was continued for about 6 hours. Refluxing was stopped and the solution was cooled to room temperature whereupon the solution took on a green tint. 80 grams of ammonium chloride was added to the green solution with stirring whereupon a precipitate formed. The solution was filtered to recover a greenish solid and a yellow-green filtrate.

The greenish solid was washed with water, filtered through a Buchner funnel, and dried. The catalyst was obtained by reacting ammonium phosphomolybdate with Adogen ®340 to produce Adogen ®340 ammonium-2-phospho-18-molybdate catalyst pursuant to the following formula:

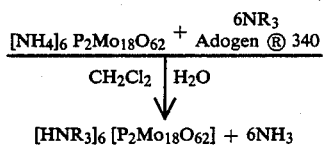

Ring opening polymerization was carried out in a bottle using the materials in the order indicated below:

| Order of Addition | Material | Quantity |
|---|---|---|
| 1 | [HNR3]6 [P2Mo18O40] catalyst | 0.1 gram |
| 2 | 92.5% DCPD/7.5% ENB | 43.7 grams |
| 3 | 0.25 M SiCl4 halogen source | 2.0 ml |
| 4 | 0.5 M DEAC cocatalyst | 2.0 ml |

The halide source and the diethylaluminum chloride catalyst solutions were prepared in DCPD.

The catalyst was solubilized in the monomers with shaking for 5 minutes. The resulting solution was green in color. Addition of SiCl4 solution produced green color whereas addition of the cocatalyst produced a brown color. Brown polymeric solid resulted.

EXAMPLE 7

This example demonstrates ring-opening polymerization using catalyst of formula III of Adogen 340 ammonium-10-molybdo-2-vanado-1-phosphate which was prepared by reacting Adogen 340 with the acid as follows:

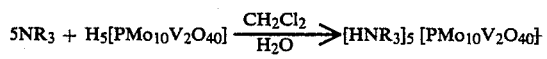

Polymerization was accomplished using materials and order of additional as summarized below:

| Order of Addition | Material | Quantity |
|---|---|---|
| 1 | catalyst | 0.1 gram |
| 2 | 92.5% DCPD/7.5% ENB | 43.7 grams |
| 3 | 0.25 M SiCl4 | 2.0 ml |
| 4 | 0.5 M DEAC | 2.0 ml |

The polymerization was carried out in the manner described in the previous examples. The catalyst was solubilized in the monomers in 1 to 2 minutes of shaking and produced a blue color. Addition of silicon tetrachloride gave a green color and addition of the cocatalyst produced a solution of brown color. Polymerization in a bottle in a 138° C. oven was complete in about one hour to one hour and a quarter.

EXAMPLE 8

This example demonstrates preparation of a phosphonium phosphomolybdate catalyst in accordance with the following equation:

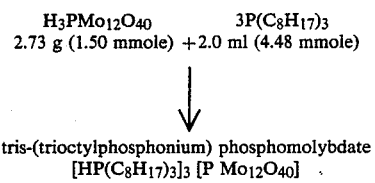

tris-(trioctylphosphonium) phosphomolybdate
[HP(C8H17)3]3 [P Mo12O40]

Tri-octylphosphine was added to 100 mls of methylene chloride in a 500 ml round bottom flask to form solution A. Phosphomolybdic acid was separately dissolved in 50 mls of distilled water to form solution B. Solutions A and B were combined with stirring in the round bottom flask to form an upper clear methylene chloride layer and a yellow water layer. Contents of the round bottom flask were refluxed for about one hour at about 40° C. and then allowed to cool. Upon refluxing, both layers became dark blue and were separated. The methylene chloride layer in the round bottom flask was washed twice with distilled water of about 2000 mls each, dried first over magnesium sulfate to remove methylene chloride and then in a vacuum oven at 70° C. for four hours. The recovered product was crystalline solid of dark green color.

The phosphonium phosphomolybdate catalyst prepared above in amount of 100 mg. or 0.0302 m mole, was added to a beverage bottle containing 40 g or 0.303 mole of 92.5%/7.5% by weight of DCPD/ENB monomer mixture to give a fine emulsion to which 2.0 ml or 0.50 m mole of 0.25 molar silicon tetrachloride solution in DCPD/ENB monomer mixture was added followed by 2.0 ml or 1.0 m mole of 0.5 molar solution of DEAC cocatalyst in the DCPD/ENB monomer mixture. The bottle was then introduced into an oven at 140° C. and within a few minutes, the solution was converted into a hard, dark-blue colored mass indicating high conversion of the monomers to the ring-opened polymer.

EXAMPLE 9

This example illustrates ring-opening copolymerization of cyclopentene in the presence of small amounts of dicyclopentadiene using a catalyst of formula II: Adogen ®340 ammonium-2-phospho-18-molybdate.

The following components were added to a bottle in the following order:

| Order of Addition | Material | Quantity |
|---|---|---|
| 1 | [HNR3]6 [P2W18O62] catalyst | 0.1 g |
| 2 | Cyclopentene | 44.0 g |
| 3 | 0.25 M SiCl4 in DCPD | 2.0 ml |
| 4 | 0.5 M DEAC in DCPD | 2.0 ml |

Polymerization was initiated after approximately one hour at slightly above ambient temperature yielding a brown polymeric material overnight.

We claim:

1. Process for preparing a polymer by ring opening polymerization in the presence of a metathesis catalyst system, said process comprising the steps of polymerizing a monomer charge comprising a norbornene-type monomer or a mixture thereof in the presence of an effective amount of a heteropolymetallate metathesis catalyst component and an effective amount of a metathesis cocatalyst component, said catalyst and cocatalyst components are soluble in said monomer charge that is polymerized and said norbornene-type monomer is characterized by the presence of at least one norbornene group defined as follows:

wherein said catalyst component is selected from organoammonium, organophosphonium, and organoarsonium heteropolymolybdates and heteropolytungstates, and mixtures thereof; and said cocatalyst component is selected form alkylaluminum, alkylaluminum halides, alkoxyalkylaluminum halides, aryloxyalkylalyminum halides, and mixtures thereof.

2. Process of claim 1 wherein said cocatalyst component is selected from compounds defined by the following formula:

$(RO)_a R'_b AlX_c$ where R is selected from alkyl and aryl groups containing 1 to 18 carbon atoms; R' is an alkyl group of 1 to 18 carbon atoms; X is a halogen; and (a), (b) and (c) represent equivalents of RO, R' and X, respectively, where (a) is about ½ to 2½, (b) is about ¼ to 2, and (c) is about 0 to 2 and the sum of (a), (b) and (c) is 3.

3. Process of claim 2 wherein in reference to said cocatalyst, the R group is selected form alkyl groups of 2 to 4 carbon atoms, and R' group also contains 2 to 4 carbon atoms.

4. Process of claim 3 wherein said norbornene-type monomer is selected form substituted and unsubstituted 2-norbornenes, dicyclopentadienes, ethylidene norbornene, dihydrodicyclopentadienes, trimers of cyclopentadienes, tetramers of cyclopentadienes, tetracyclododecenes, and mixtures thereof.

5. Process of claim 3 wherein said norbornene-type monomer is selected from norbornene, alkyl norbornenes containing 1 to 3 carbon atoms in said alkyl group, ethylidene norbornene, vinyl norbornene, dicyclopentadiene, trimers of cyclopentadiene, tetramers of cyclopentadiene, tetracyclododecene, alkyltetracyclododecenes containing 1 to 3 carbon atoms in said alkyl group, and mixtures thereof.

6. Process of claim 1 wherein said catalyst component is selected from heteropolymetallate compounds defined by the following formulas I, II and III:

$A_{(8-n)} [X M_{12}O_{40}]$ (I)

$A_a[Y_2M_{18-x}M'_xO_{62}]$ (II)

$A_b[Z M_{12-y}M''_yO_{40}]$ (III)

where:
A = NR$_3$H, PR$_3$H, AsR$_3$H, NR$_4'$, Pr$_4'$, and AsR$_4'$;
N = nitrogen
P = phosphorus
As = arsenic;
R and R' = alkyl and alkylene groups of 1-20 carbons, cycloaliphatic groups of 5-16 carbons wherein the sum of the carbons in all R and R' is large enough so that the molecule is soluble in said monomer charge;
X = elements and mixtures of such elements of Groups IB, IIB, IIIA, IVA, IVB, VA, and VIII in their highest oxidation states;
M = molybdenum, tungsten and mixtures thereof;
M' = vanadium or niobium;
M" = vanadium, niobium, and rhenium;,
m' = highest oxidation state of M' (5 for vanadium, and 5 for niobium);
m" = highest oxidation state of M" (5 for vanadium, 5 for niobium, and 7 for rhenium);
Y = P$^{+5}$, As$^{+5}$, and mixtures thereof;
n = highest oxidation state for the hetero atom;
Z = phosphorus, silicon, and mixtures thereof
a = 16 + 6x − m'x − 2n
b = 8 + 6y − ym" − n
y = number of M" metal ions
x = number of M' metal ions.

7. Process of claim 6 wherein in formula I, X is selected from phosphorus, silicon, boron, germanium, arsenic, titanium, and zirconium; n for each of the hetero atoms is as follows:
phosphorus = 5
silicon = 4
boron = 3
germanium = 4
arsenic = 5
titanium = 4
zirconium = 4
and wherein in formula III, M' is vanadium.

8. Process of claim 7 wherein amount of said heteropolymatellate catalyst component is 0.01 to 50 millimoles of molybdenum or tungsten and said hetero atom(s) per mole of said monomer(s) and molar ratio of said cocatalyst component to said catalyst component is in the range of 200:1 to 1:10 of aluminum to molybdenum or tungsten and said hetero atom(s).

9. Process of claim 2 wherein said catalyst component is selected from heteropolymetallate compounds defined by the following formulas I, II and III:

$A_{(8-n)} [X M_{12}O_{40}]$ (I)

$A_a[Y_2M_{18-x}M'_xO_{62}]$ (II)

$A_b[Z M_{12-y}M''_yO_{40}]$ (III)

where:
A = NR$_3$H, PR$_3$H, AsR$_3$H, NR$_4'$, Pr$_4'$, and AsR$_4'$;
N = nitrogen
P = phosphorus
As = arsenic;
R and R' = alkyl and alkylene groups of 1-20 carbons, cycloaliphatic groups of 5-16 carbons wherein the sum of the carbons in all R and R' is large enough so that the molecule is soluble in said monomer charge;
X = elements and mixtures of such elements of Groups IB, IIB, IIIA, IVA, IVB, VA, and VIII in their highest oxidation states;
M = molybdenum, tungsten and mixtures thereof;
M' = vanadium or niobium;
M" = vanadium, niobium, and rhenium;

$m'$ = highest oxidation state of M' (5 for vanadium, and 5 for niobium);
$m''$ = highest oxidation state of M'' (5 for vanadium, 5 for niobium, and 7 for rhenium);
$Y = P^{+5}, As^{+5}$, and mixtures thereof
$n$ = highest oxidation state for the hetero atom;
$Z$ = phosphorus, silicon, and mixtures thereof
$a = 16 + 6x - m'x - 2n$
$b = 8 + 6y - ym'' - n$
$y$ = number of M'' metal ions
$x$ = number of M' metal ions.

10. Process of claim 9 wherein in formula I, X is selected from phosphorus, silicon, boron, germanium, arsenic, titanium, and zirconium and n for each of the hereto atoms is as follows:
phosphorus = 5
silicon = 4
boron = 3
germanium = 4
arsenic = 5
titanium = 4
zirconium = 4
and wherein in formula III, M' is vanadium.

11. Process of claim 10 wherein said heteropolymetallate catalyst component is selected from organoammonium-1-boro-12-tungstate, 1-phospho-12-tungstate, 1-phospho-12-molybdate, 1-phospho-6-molybdo-6-tungstate; 2-phospho-18-molybdate; and 1-phospho-2-vanado-10-molybdate, and mixtures thereof; wherein said heteropolymetallate catalyst component is used at a level of 0.1 to 10 millimoles per mole of monomer; and wherein molar ratio of said cocatalyst component to said catalyst component is in the range of about 50:1 to 2:1.

12. Process of claim 10 which also includes the step of adding a halogen source in amount of 0.1 to 2 millimoles per mol of said monomer(s), said halogen source is selected from chlorosilanes.

13. Process of claim 12 wherein said halogen source is selected from dimethylmonochlorosilane, dimethyldichlorosilane, diphenyldichlorosilane, tetrachlorosilane, and mixtures thereof.

14. Process of claim 12 which includes the step of mixing multiple streams containing said heteropolymetallate catalyst, said cocatalyst, said halogen source, and said monomer(s) to produce a reactive mixture, and the step of injecting said reactive mixture into a mold where said polymerization takes place to produce a thermoset polymer.

15. Process of claim 14 wherein conversion of said polymer is at least 95%, measured by thermal gravimetric procedure.

16. Process of claim 10 wherein said norbornene-type monomer is selected from substituted and unsubstituted 2-norbornenes, dicyclopentadienes, ethylidene norbornene, dihydrodicyclopentadienes, trimers of cyclopentadienes, tetramers of cyclopentadienes, tetracyclododecenes, and mixtures thereof.

17. Process of claim 10 conducted in the presence of an effective amount of a hydrocarbon solvent.

* * * * *